(12) United States Patent
Ellis

(10) Patent No.: US 7,654,683 B2
(45) Date of Patent: Feb. 2, 2010

(54) BI-DIRECTIONAL RECHARGEABLE/REPLACEABLE INDUCTION POWER PACK AND METHOD

(76) Inventor: Stephen K. Ellis, 1324 Westminster Ave., Salt Lake City, UT (US) 84105

( * ) Notice: Subject to any disclaimer, the term of this patent is extended or adjusted under 35 U.S.C. 154(b) by 477 days.

(21) Appl. No.: 11/595,425

(22) Filed: Nov. 10, 2006

(65) Prior Publication Data
US 2008/0112158 A1    May 15, 2008

(51) Int. Cl.
F21L 4/08    (2006.01)
(52) U.S. Cl. .................................... 362/158; 362/183
(58) Field of Classification Search ................. 362/158, 362/183
See application file for complete search history.

(56) References Cited

U.S. PATENT DOCUMENTS

| 4,481,458 A | 11/1984 | Lane |
| 5,225,760 A | 7/1993 | Lieserson |
| 6,064,857 A | 5/2000 | Wiedeman |
| 6,094,029 A | 7/2000 | Reynolds et al. |
| 6,479,964 B2 | 11/2002 | Woodroffe et al. |
| 6,784,568 B2 | 8/2004 | Powers |
| 6,945,666 B2 | 9/2005 | Woolfson |
| 2007/0182367 A1* | 8/2007 | Partovi ........................ 320/108 |
| 2008/0001696 A1* | 1/2008 | Coulson et al. ............. 336/115 |
| 2008/0130268 A1* | 6/2008 | Johnson et al. ............. 362/158 |

* cited by examiner

Primary Examiner—David V Bruce
(74) Attorney, Agent, or Firm—Marcus G. Theodore

(57) ABSTRACT

A bi-directional rechargeable/replaceable induction power pack and method employing sealed induction coils to power an electrical device underwater, in liquids, or in high humidity conditions.

13 Claims, 4 Drawing Sheets

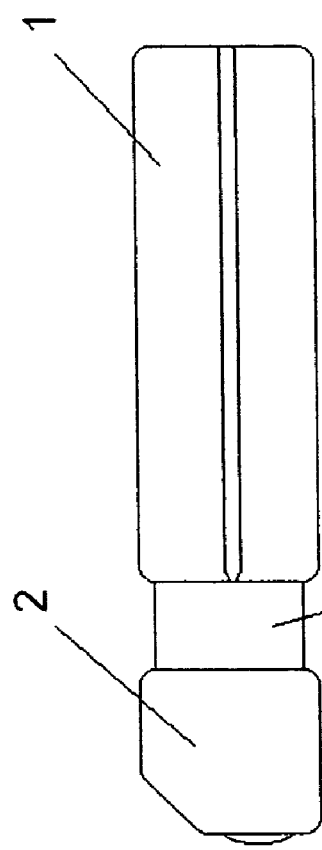
SIDE VIEW
FIG. 1
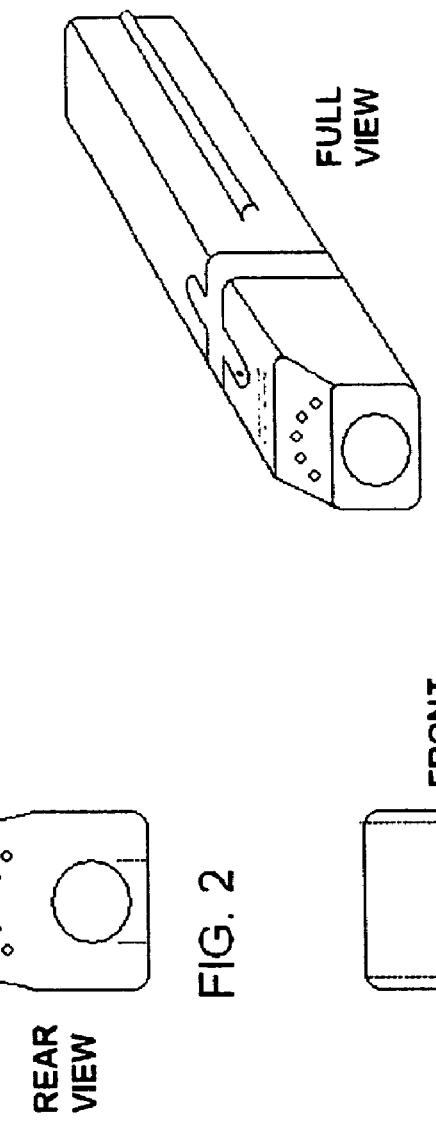
FULL VIEW
FIG. 4
REAR VIEW
FIG. 2
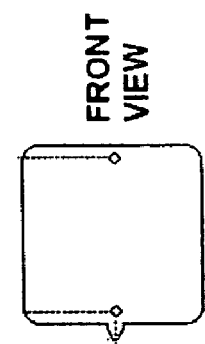
FRONT VIEW
FIG. 3

BI-DIRECTIONAL RECHARGEABLE/REPLACEABLE INDUCTION POWER PACK AND METHOD

BACKGROUND OF THE INVENTION

1. Field of Invention

The present invention relates to rechargeable power packs and associated equipment. In particular, it relates to a bi-directional rechargeable/replaceable induction power pack employing sealed induction coils to power an electrical device underwater, in liquid, or in high humidity conditions.

2. Description of Related Art

Various rechargeable power packs and devices associated therewith are known. Electronic toothbrushes, for example, are charged via a powered induction holder associated with an electrical outlet and are not designed for use underwater. These toothbrushes do not employ bi-directional power, in that they do not store and transfer power to another electrical device for use, but consume the power within the same unit.

Faraday, or renewable energy, flashlights use a magnetic shaking system passing a charging magnet through a coil surrounding the magnet to generate electricity to power a light. Although they may be used underwater, they also are not bi-directional to store and transfer power to another electrical device. The Faraday flashlights use magnetic induction to create power, not to function as a power transfer method to and from pre-existing circuits.

Electric transformers use two or more multiturn coils of wire placed in close proximity to cause the magnetic field of one to link the other for transferring electric energy from one or more alternating current circuits to one or more other circuits by magnetic induction. Although they employ magnetic induction principals, they are not suited for use underwater as their components are exposed and are generally not bi-directional. Transformers are not regularly taken apart; the components are not physically separated, but treated as one unit or device.

Other devices employ removable power packs, but have exposed contacts. Woolfson, U.S. Pat. No. 6,945,666 dated Sep. 20, 2005 discloses an illumination device with a removable power pack. It employs mating power terminals connected internally to the housing and is repowered either removed from the housing or via a charging port exposed when mounted within the housing. Usage of this device and the others contemplates usage in a dry environment.

Reynolds et al, U.S. Pat. No. 6,094,029 dated Jul. 25, 2000 discloses a rechargeable power pack structured to recharge rechargeable batteries via a plug inserted into an electrical outlet.

Leiserson, U.S. Pat. No. 5,225,760 discloses a rechargeable power back shaped and dimensioned to be removably inserted into the battery compartment of an electrical device. After discharge, it is removed, recharged, and then reinserted into the electrical device.

Lane, U.S. Pat. No. 4,481,458 dated Nov. 6, 1984 discloses a miner's lamp power pack employing a rechargeable dry cell and rechargeable device therefore.

Cited for general interest is Wiedeman et al, U.S. Pat. No. 6,064,857, which discloses a dual mode satellite telephone with hybrid battery/capacitor power supply. Woodroffe et al, U.S. Pat. No. 6,479,964 discloses a power pack for cordless tools and electronics. It includes a miniature internal combustion motor/alternator combination with an attached fuel supply designed to provide DC output used to charge batteries and/or capacitors. Powers, U.S. Pat. No. 6,784,568 dated Aug. 31, 2004 discloses a device with multiple, concurrently-installed power modules and methods for controlling the same as an electrotherapy device with various types of rechargeable battery packs, no-rechargeable battery packs and AC power packs.

None of these devices is adapted for use underwater or in damp conditions as a bi-directional power pack. The present invention described below provides a bi-directional rechargeable/replaceable induction power pack employing an interchangeable sealed induction coil rechargeable power pack to power various electronic devices underwater or in high humidity conditions.

SUMMARY OF THE INVENTION

The present invention comprises a bi-directional water resistant rechargeable/replaceable induction power pack having a sealed water resistant housing surrounding a chargeable battery/capacitor associated with one or more magnetic induction coils via internal electronics. The water impervious sealed housing may have an interior cavity into which its components are mounted, or the electronic components may be embedded and sealed within a material of a thickness and constructed of a material to allow magnetic induction to occur. The interior magnetic induction coil(s) is (are) located within the interior of the sealed housing and is (are) positioned and structured to respond to a corresponding exterior magnetic induction coil located exterior to the housing. When brought into the proximity of and activated by an external power source or magnetic induction device, the exterior magnetic induction coil acts in combination with an interior magnetic induction coil to convert magnetic energy into electric current in a charging mode, and to release electromagnetic energy through an interior magnetic induction coil in a discharging mode. A rechargeable battery and/or capacitor is located within the sealed housing and is associated with the interior induction coil(s) for storage and release of electromagnetic energy generated.

Internal electronics are also mounted within the sealed housing and operably associated with the induction coil(s) and rechargeable battery and/or capacitor to selectively charge said battery and/or capacitor with electromagnetic energy, in a storage mode. The battery and/or capacitor is then discharged in another mode when the induction power pack is brought into proximity of a corresponding exterior induction coil associated with an electrical device to charge and/or power said device.

The following are the main essential components of a preferred embodiment of the bi-directional rechargeable/replaceable induction power pack:

Chargeable Battery/Capacitor
Magnetic Induction coils
Internal Electronics
Waterproof/water-resistant/liquid-resistant containers
Charging station
Electronic/electric system requiring power
External power source
Electric wires
External electronic device The bi-directional water resistant rechargeable/replaceable induction power pack is used in conjunction with various water resistant shielded electrical devices. A typical rechargeable/replaceable induction power pack system uses at least one removable bi-directional water resistant rechargeable/replacement power pack. This water and fluid impervious sealed power pack is removably inserted into, or interfaced with, an electronic device sealed within a water and fluid impervious case via a slot or interface which accommodates at least one water resistant rechargeable/replaceable induction power pack. This electronic device has a corresponding induction coil positioned to be operably associated with the inserted or interfaced power pack interior magnetic induction coil. Resulting power from the discharged electromagnetic energy released from the power pack drives the electronic device and is regulated with circuitry and transmission means.

When the power pack is drained, it is removed and recharged by a charging station associated with a power source. The recharged rechargeable/replaceable power pack is then re-inserted into the device to continue powering the electronic device.

Hence, the invention operates as follows:

Electric current is converted to electromagnetic energy for storage in a power pack, and is then transferred back to electric current via corresponding magnetic induction coils within a sealed electrical device in response to the release of electromagnetic energy from the power pack. This method of use incorporates rechargeable/replaceable power packs encased in watertight containers, and transfers their power to a separate watertight container housing the electrical device. The applicable products are designed to be water resistant, which means the electronic/electrical systems are sealed to keep water out. The uses are to transfer power via magnetic induction from a charger to a battery/capacitor and from the battery/capacitor to an internal set of electronics and an external set of electronics. No part of the electronics is exposed to environmental liquids.

Specifically, the battery/capacitor receives a charge through the charging station via magnetic induction. The charging station has a coil that is given electricity from standard (120/240V) power sources, although other power sources and voltages are also applicable to this invention. The charging station coil is half of an electric/magnetic transformer. When mated with a corresponding power pack coil, the two coils convert the charging station electricity into a localized magnetic field within the power pack coil by alternating the electric current. This power pack coil is shielded from water in the charger to prevent water from making contact with electrical components.

Thus, when the power pack container sealed coil comes in proximity of the charging station, the station transfers electromagnetic energy to the power pack container through magnetic induction. The power pack coil then coverts the electromagnetic field into electricity. This process is generally known as magnetic induction through a transformer, but heretofore has not employed bi-directional sealed components. The power pack electricity is then transferred to the battery/capacitor and stored for later use.

The power pack has internal electronics that can use the stored power. The power pack is then connected or interfaced with an external electrical device that also has a corresponding magnetic induction coil. In this configuration, the power pack transfers power to the external device via magnetic induction. The external device then uses the received power in its own defined ways.

For use underwater, the impervious case slot includes liquid evacuation ports in communication with the slot interior and case exterior to allow liquids to escape when a power pack is inserted therein when the power pack system is operated in liquids. The rechargeable/replaceable induction power pack system may include alignment means wherein the power pack and slot have corresponding slots and grooves to aid in the insertion and removal of the power pack for proper operating alignment. These alignment means are optional when the power pack has a symmetrical design, such as a cylindrical housing with cylindrical magnetic induction coils.

In a preferred embodiment, the bi-directional rechargeable/replaceable induction power pack system powers a flashlight having internal power components similar to that described above. A water impervious case has an opening to emit light. The opening has a lens or transparent/translucent material sealing the opening, such that a light source powered by the electrical components transmits light through the lens or transparent/translucent material. Internal electrical circuitry selectively powers the light source to produce light.

The present invention is therefore particularly adapted to provide a power pack system particularly suited for use near water with various electrical components. It allows the power supply to be replaced while submerged in liquids (most commonly water). It doesn't have to be removed from the liquids and dried before power charging access to electronics is allowed.

Its method of use allows the local power source to be removed while submerged. It also prevents corrosion and damage to electronic circuits and components. It also is not subject to the largest risk with underwater electronics subject to seal failure at the access doors/points to replace or charge the batteries of conventional devices using current sealing technology (o-rings, positive pressure, etc.). Water damage to the electronics is thus avoided.

BRIEF DESRIPTION OF THE DRAWINGS

FIG. 1 is a side view of one preferred embodiment of a power pack of the invention.

FIG. 2 is a rear view of the power pack of FIG. 1.

FIG. 3 is a front view of the power pack of FIG. 1.

FIG. 4 is a perspective view of the power pack of FIG. 1.

DESCRIPTION OF THE ILLUSTRATED EMBODIMENTS

Figure 5:
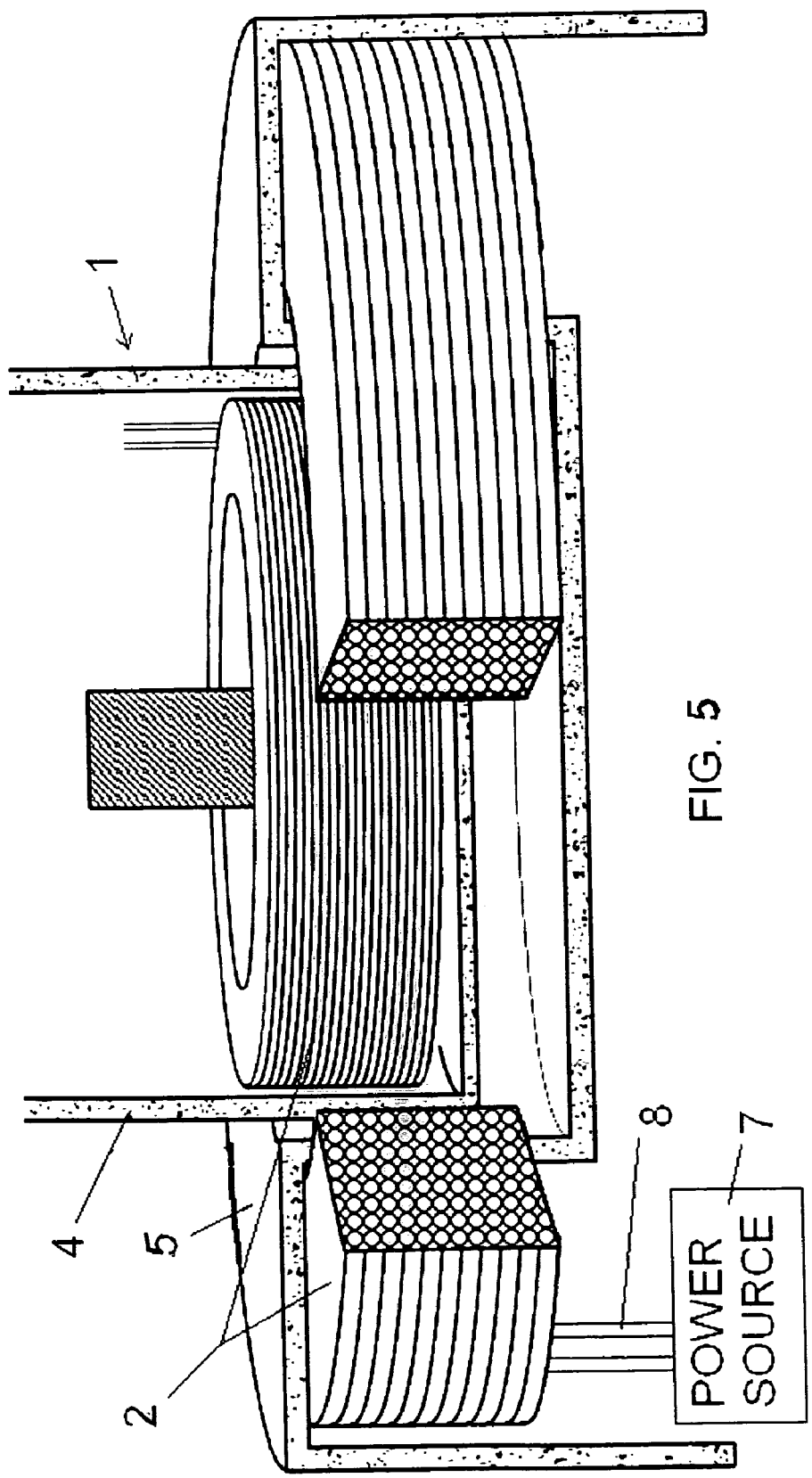
FIG. 5 is a cross sectional view of the charging station with power pack inserted.

One preferred embodiment of the bi-directional interchangeable power pack 10 is shown in the FIG. 1 side view, the FIG. 2 rear view, the FIG. 3 front view, and the FIG. 4 perspective view. This rectangular shape of the power pack 10 is not a limiting factor as the shape may vary and is often cylindrical. The interchangeable power pack 10 is particularly suited to power underwater electronic devices, such as flashlights, employed in SCUBA diving and other underwater activities.

As shown in FIG. 1, a magnetic coil 2 is placed in the front of the power pack 10. It is connected with internal electronics 3 to a battery/capacitor 1. These components 1, 2, 3 are encased in a water-resistant case 4 constructed of a material and thickness to allow magnetic induction to occur.

Figure 6:
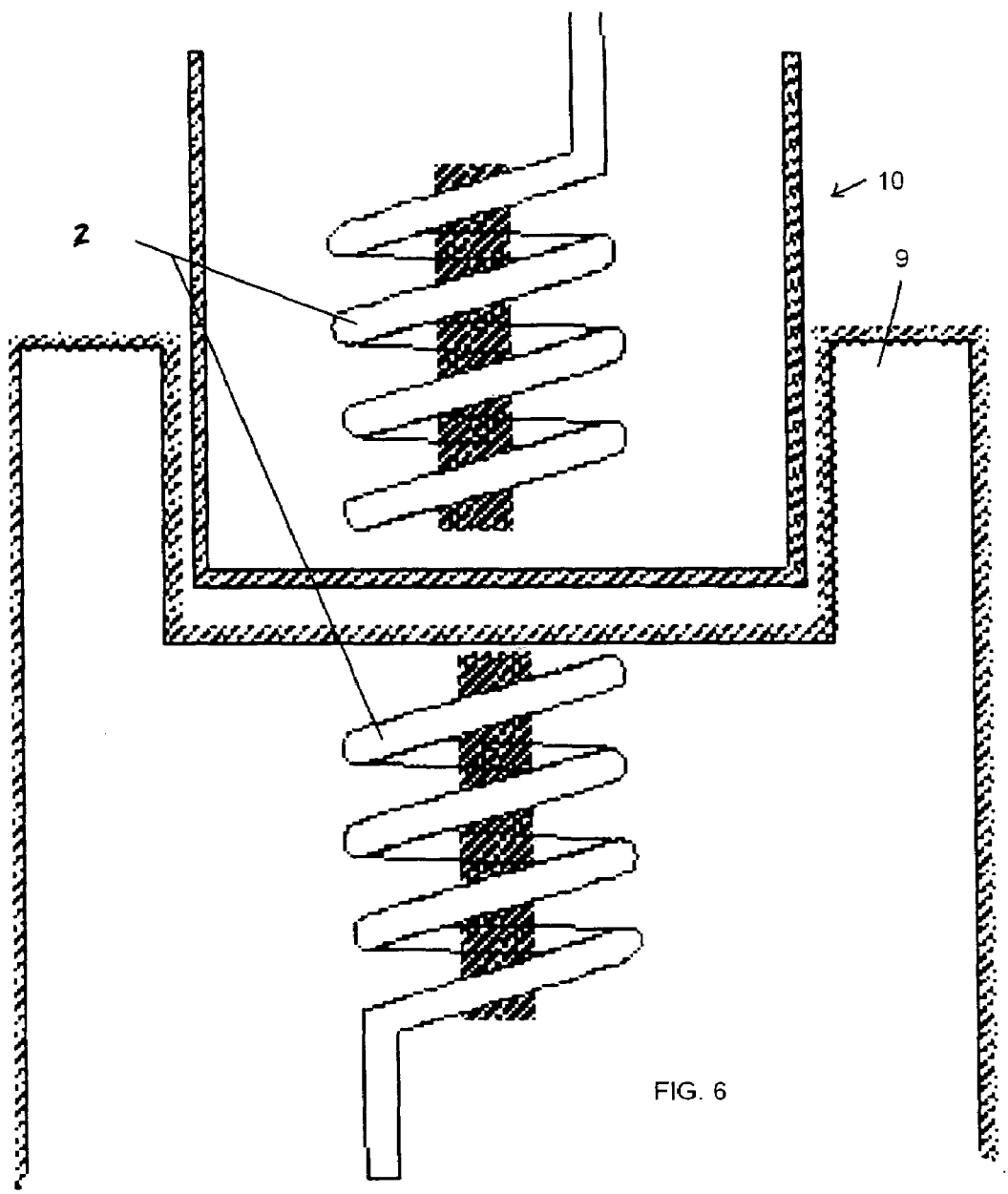
FIG. 6 is a cut away view showing coil alignment of the electrical device.

FIG. 5 illustrates a cut away of a power pack 10 placed in a charging station 5 such that the coils align for charging by a power source 7 connected with electric wires 8. After charging, the power pack 10 is inserted within a receptacle slot of an electronic device 9, such that their coils 2 are aligned as shown in FIG. 6.

The components of the bi-directional interchangeable power pack system shown are as follows:

1 Chargeable Battery/Capacitor

Figure 7:
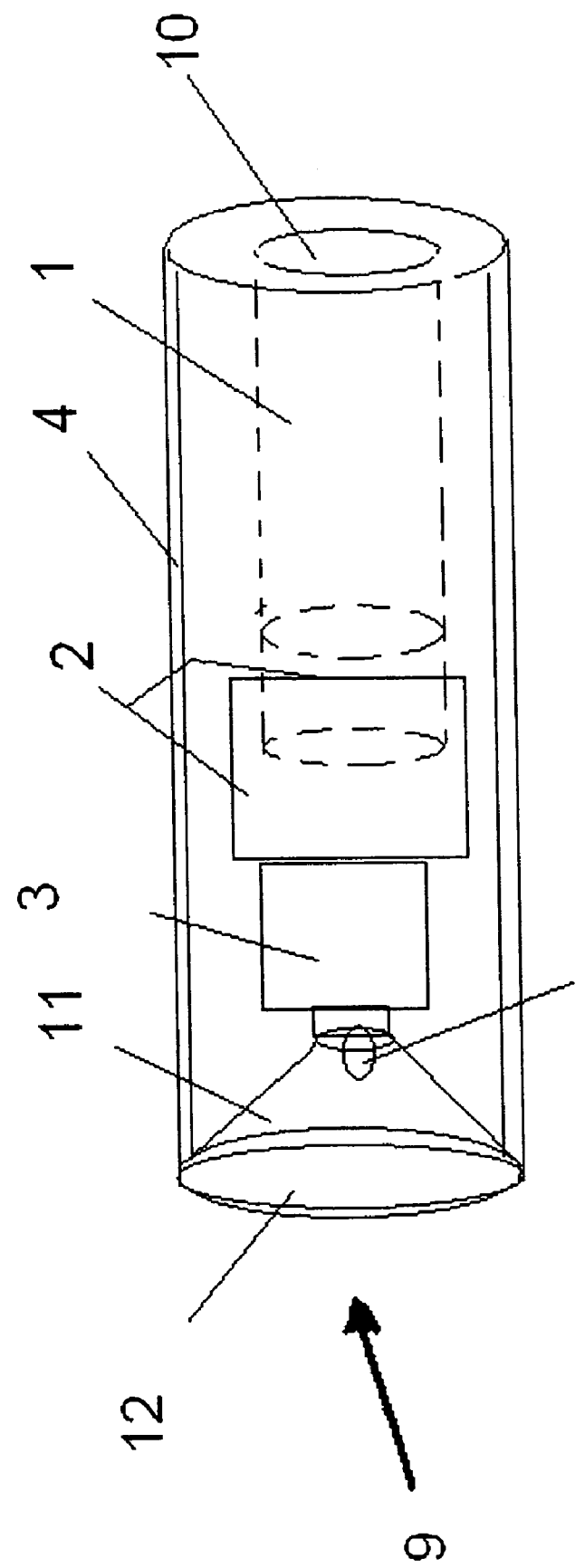
FIG. 7 is a perspective view of the power pack of FIG. 1 powering a flashlight.

2 Magnetic Induction coils
3 Internal Electronics
4 Waterproof/water-resistant/liquid-resistant containers
5 Charging station
6 Electronic/electric system requiring power
7 External power source
8 Electric wires
9 External electronic device FIG. 7 is a perspective view of the power pack 10 of FIG. 1 shaped as a cylinder and inserted into a flashlight electronic device 9. The flashlight has a water-resistant case 4 in which are sealed internal electronics 3, a corresponding magnetic induction coil 2 structured to surround and be operationally adapted to accept power from the power pack 10 magnetic induction coils 2. The case 4 has a built in seamless lens 12 through which is directed by a reflector mirror 11 light from a light source 13, such as an LED. The flashlight electrical components are thus all internally sealed and do not come into direct contact with the power pack 10.

The above main components may be supplemented with more specialized components. For example, a specialized power button (not shown) may be included. This power button may be multi functional for different uses.

The preferred power meter embodiment provides a reading of how much power is left in the battery relative to the connected device. The power meter is always visible when the power pack is turned on. A power reading can also be obtained while the power pack is off by pressing the power button.

As discussed above, the method used to charge the power pack is magnetic induction. A power source delivers electricity to a magnetic induction coil at the transmitting point of the charging device. A magnetic induction coil in the power pack receives the electricity and charges the battery or capacitor. This phase is similar to that of a transformer. In the preferred embodiment, a magnetic key will align with a transmitter or receiver (not shown) on the charging station 5 that switches the direction of power flow, turning the power pack into a receiver rather than a transmitter of power. This invention is not limited to the magnetic key employment and may use alternate or combined methods for communication such as radio frequency, infrared, etc.

The power pack distributes power to the recipient devices through magnetic induction. The battery delivers electricity to a magnetic induction coil or electromagnet located inside the power pack. A magnetic induction coil or electromagnet at the reception point receives the electricity and powers the device.

Several battery types and/or capacitors can be used to power the power pack; the preferred method would use Lithium-Ion batteries.

The magnetic power transfer point enables the transfer of electricity from one device to another, even through completely sealed containers. Inside the power pack rests half of an electric transformer, or the magnetic induction coil. The power pack system activates the magnetic power transfer through this component after passing a magnetic trip from a magnetic key or other previously defined method, which indicates if the battery or capacitor core is in position.

The preferred embodiment of the power pack 10 system may include high-shock rubber shoes (not shown) to increase protection of the casing and electronics from external impact.

The power pack 10 system may also include a wireless RF type communication link (not shown) between the battery and target electrical device. Alternatively, wireless optical type technology may be included. In another variation, a magnetic relay type of technology may be employed in this regard so to enable charging from charging coils different from discharge coils.

Any conventional methods of charging the sealed battery may be included, such as by solar photo voltaic power.

The present invention thus provides a bi-directional rechargeable/replaceable induction power pack employing an interchangeable sealed induction coil rechargeable power pack to power various electronic devices underwater, liquid, or in high humidity conditions.

The above description and specification should not be construed as limiting the scope of the claims. The claims themselves contain those features deemed essential to the invention.

I claim:

1. A bi-directional water resistant rechargeable/replaceable induction power pack system comprising:
   a. a power pack having:
      i. a water impervious sealed housing with an interior, said sealed housing of a thickness and constructed of a material to allow magnetic induction to occur,
      ii. an interior magnetic induction coil or coils located within the interior of the sealed housing structured and positioned to respond to a corresponding exterior magnetic induction coil or coils located exterior to the housing when juxtaposed and activated by an independent external power source to convert electromagnetic energy into electric current in a charging mode, and to release electromagnetic energy in a discharging mode,
      iii. a rechargeable battery and/or capacitor located within the sealed housing and associated with the interior induction coil for selective storage of electromagnetic energy from an induction coil or coils and release of electromagnetic energy to an induction coil or coils,
      iv. internal electronics operably associated with the induction coil or coils and rechargeable battery and/or capacitor to selectively charge said battery and/or capacitor, in one mode and discharge said battery and/or capacitor in another mode through the interior magnetic induction coil to generate electromagnetic energy, and
   b. an electronic device sealed within a water impervious case with a slot to accommodate at least one removably inserted power pack, the electronic device having:
      i. a corresponding exterior magnetic induction coil positioned near the slot to be operably associated with the inserted power pack interior magnetic induction coil to generate electricity from the electromagnetic energy released by the power pack interior magnetic induction coil, and
      ii. regulation and transmission means to transmit electric current produced by the exterior corresponding induction coil to power the electric device.

2. A rechargeable/replaceable induction power pack system, according to claim 1, wherein the impervious case slot includes liquid evacuation ports or physical channels in communication with the slot interior to allow liquids to escape when a power pack is inserted therein when the power pack system is operated in a liquid environment.

3. A rechargeable/replaceable induction power pack system, according to claim 2, wherein the power pack and slot have corresponding alignment means to aid in the insertion and removal of the power pack for proper operating alignment.

4. A rechargeable/replaceable magnetic induction power pack system, according to claim 1, wherein the electric device is a flashlight having:

i. support structure within the water impervious case having a light opening,
  ii. an electrical powered light emitter mounted on the support structure or case, and
  iii. circuitry mounted on the support structure and connected to the light emitter and the induction coil adapted to selectively power the light emitter to produce light.

5. A rechargeable/replaceable induction power pack system according to claim 4 including a cover.

6. A rechargeable/replaceable induction power pack system according to claim 5 wherein the cover is a magnifying lens and including a reflector associated with the light emitter.

7. A rechargeable/replaceable induction power pack system, according to claim 1, including a wireless communication link between the battery and electric device.

8. A method of using a bi-directional liquid resistant rechargeable/replaceable induction power pack system comprising:
  a. charging a power pack having:
  i. a liquid impervious sealed housing with an interior, said sealed housing of a thickness and constructed of a material to allow magnetic induction to occur,
  ii. an interior magnetic induction coil or coils located within the interior of the sealed housing structured and positioned to respond to a corresponding exterior magnetic induction coil or coils located independent of and exterior to the housing when juxlaposed and activated by an external power source to convert electromagnetic energy into electric current in a charging mode, and to release electromagnetic energy in a discharging mode,
  iii. a rechargeable battery arid/or capacitor located within the sealed housing and associated with the interior induction coil or coils for selective storage of electromagnetic energy from art induction coil or coils and release of electromagnetic energy to an induction coil or coils,
  iv. internal electronics operably associated with the induction coil and rechargeable battery and/or capacitor to selectively charge said battery and/or capacitor, in one mode and discharge said battery and/or capacitor in another mode through the interior magnetic induction coil to generate electromagnetic energy, and
  b. inserting the power pack into an electronic device scaled within a liquid impervious case with a slot to accommodate at least one removably inserted power pack, the electronic device having:
  i. a corresponding exterior magnetic induction coil positioned near the slot to be operably associated with the inserted power pack interior magnetic induction coil to generate electricity from the electromagnetic energy released by the power pack interior magnetic induction coil, and
  ii. regulation and transmission means to transmit electric current produced by the exterior corresponding induction coil to power an electric device, and
  c. powering the electronic device with the replaceable/rechargeable power pack.

9. A method off using a bi-directional liquid resistant rechargeable/replaceable induction power pack system according to claim 8, wherein charging a power pack comprises charging a scaled battery by solar photo voltaic power.

10. A method of using a bi-directional liquid resistant rechargeable/replaceable induction power pack system according to claim 8, including a wireless communication link between the battery and electric device.

11. A method of using a bi-directional liquid resistant rechargeable/replaceable induction power pack system according to claim 10, wherein the wireless communication link between the battery and electric device is of RF type technology.

12. A method of using a bi-directional liquid resistant rechargeable/replaceable induction power pack system according to claim 10, wherein the wireless communication link between the battery and electric device is of wireless optical type technology.

13. A method of using a bi-directional liquid resistant rechargeable/replaceable induction power pack system according to claim 10, wherein the wireless communication link between the battery and electric device is of magnetic relay type technology.

* * * * *